US011562570B2

(12) United States Patent
Iyer et al.

(10) Patent No.: US 11,562,570 B2
(45) Date of Patent: Jan. 24, 2023

(54) VEHICLE DAMAGE IDENTIFICATION AND INCIDENT MANAGEMENT SYSTEMS AND METHODS

(71) Applicant: Ford Global Technologies, LLC, Dearborn, MI (US)

(72) Inventors: Vidhya Iyer, Sunnyvale, CA (US); Romil Shah, Santa Clara, CA (US); Shounak Athavale, San Jose, CA (US); Sakthi Narayanan Balasubramanian, Tamil Nadu (IN)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

(21) Appl. No.: 17/063,988

(22) Filed: Oct. 6, 2020

(65) Prior Publication Data
US 2022/0108115 A1 Apr. 7, 2022

(51) Int. Cl.
G06V 20/56 (2022.01)
G06Q 40/08 (2012.01)
G06N 20/00 (2019.01)
H04N 7/18 (2006.01)
G06V 20/62 (2022.01)

(52) U.S. Cl.
CPC ............ G06V 20/56 (2022.01); G06N 20/00 (2019.01); G06Q 40/08 (2013.01); H04N 7/181 (2013.01); H04N 7/188 (2013.01); G06V 20/625 (2022.01); G06V 2201/08 (2022.01)

(58) Field of Classification Search
CPC ...................................... G06V 20/56
See application file for complete search history.

(56) References Cited

U.S. PATENT DOCUMENTS 11,250,054 B1 * 2/2022 Campbell .............. H04N 7/183
2018/0152673 A1 * 5/2018 Kim ................... H04N 5/23206
2019/0095877 A1 * 3/2019 Li ......................... G06N 3/0454

FOREIGN PATENT DOCUMENTS

DE 102017203661 A1 9/2018
WO 2018/191421 A1 10/2018

OTHER PUBLICATIONS

Gontscharov et al., "Algorithm development for minor damage indentification in vehicle bodies using adaptive sensor data processing", SicenceDirect, Procedia Technology 15 (2014) pp. 586-594.

* cited by examiner

Primary Examiner — Daniel T Tekle
(74) Attorney, Agent, or Firm — Brandon Hicks; Eversheds Sutherland (US) LLP

(57) ABSTRACT

Vehicle damage identification and incident management systems and methods are provided herein. An example method can include determining occurrence of a damage event for a first vehicle based on a vehicle sensor signal, determining a location on the first vehicle where damage has occurred using the vehicle sensor signal, activating a camera on a side of the first vehicle corresponding with, or adjacent to, the location on the first vehicle where damage has occurred, determining, from camera images, identifying information related to an object captured in the camera images, and transmitting a message to a recipient that includes the identifying information.

14 Claims, 4 Drawing Sheets

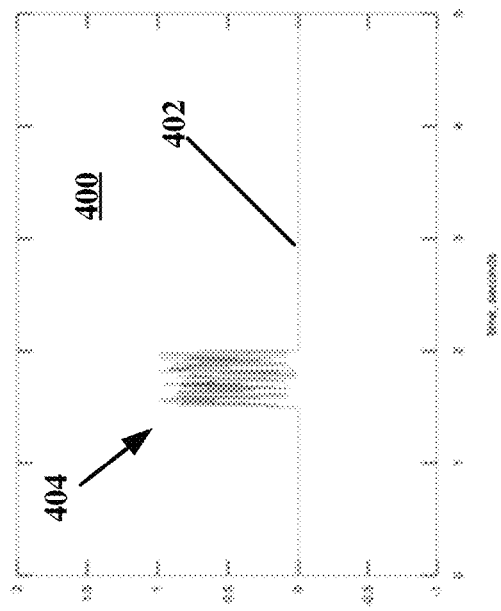
FIG. 2
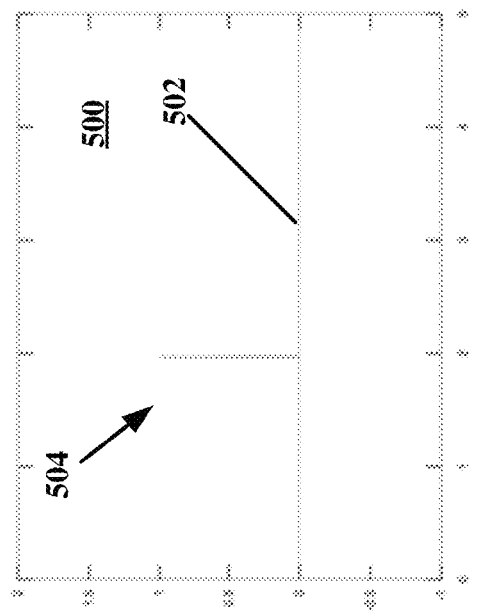
FIG. 4
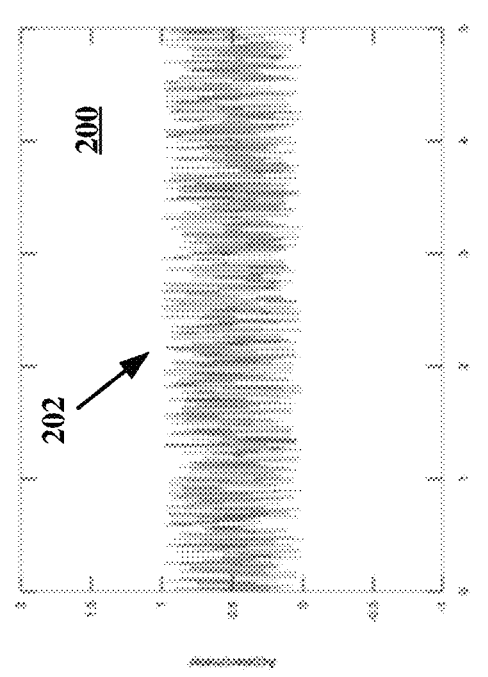
FIG. 3
FIG. 5

VEHICLE DAMAGE IDENTIFICATION AND INCIDENT MANAGEMENT SYSTEMS AND METHODS

FIELD

The present disclosure is generally directed to systems and methods that allow connected and non-connected vehicles to identify vehicle damage and perform incident management and reporting.

BACKGROUND

Vehicles are vulnerable to minor or major damage when parked. Minor scratches, dents, and glass damage often go unnoticed. Damage can be caused by another vehicle bumping or scratching into the vehicle, key scratches, and bikes/pedestrians bumping into the vehicle—just to name a few.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIGS. 2-5 graphically illustrate sensor signals and deviations that are indicative of damage events.

DETAILED DESCRIPTION

Overview

Figure 1:
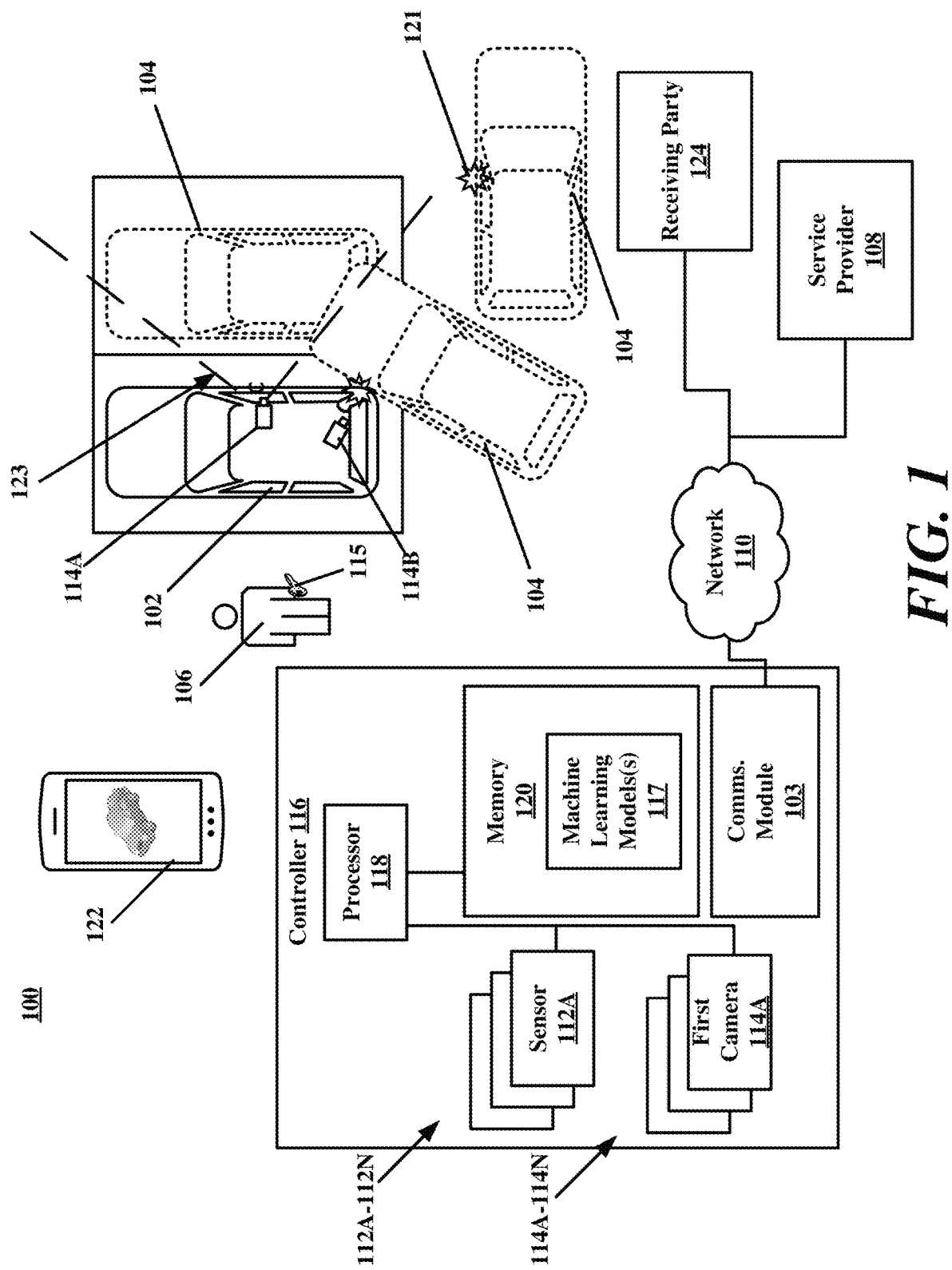
FIG. 1 depicts an illustrative architecture in which techniques and structures for providing the systems and methods disclosed herein may be implemented.

The present disclosure pertains to systems and methods that identify vehicle damage in real-time and alert users of connected and non-connected vehicles. Example methods may involve distinguishing between types of damage and intensity of the damage. A message or report, such as an incident claim form, indicative of the damage may be communicated to a vehicle owner, a rental company, or third-parties such as police, insurance and/or EMS (emergency management service). Communication of messages such as those described herein can be based on damage type and/or damage intensity/severity. Damage may be determined using sensors on a vehicle using a Machine Learning (ML) model under supervised learning. Once a model is trained, a continuous signal output response from the sensors may be integrated into the trained model, which can then classify the damage into different categories or types. Another model can be trained to identify the type and/or intensity of the damage. Constant noise or vibration present in a static vehicle can also be trained and eliminated by the model (e.g., ML noise model). Inputs can be integrated from multiple sensors like accelerometers, gyroscopes, sounds, or vibrations—just to name a few to identify the type of damage and its intensity.

When damage is detected and has been classified as significant damage (e.g., threshold exceeding damage), the vehicle cameras can be activated in real-time or near-real-time to record a location on the vehicle (such as a body panel, window, bumper, etc.) where the damage has occurred. Other cameras on the vehicle may be activated and pointed to the area of damage depending on the direction of the damage and the ability of the camera to pan or tilt. This type of camera adjustment can be used to capture an object (car, bike, person, etc.) that likely caused the damage. The systems and methods disclosed herein can also determine unique features like license plates or human faces to identify the vehicle or individual that may have caused the damage. For example, text on the vehicle could be identified as 'Rental Service Co.', the report can include a nearby Rental Service Co. that can be contacted to report the damage. The vehicle type, make, and the model can be identified if certain sides of the vehicle are seen like the rear side.

Systems and methods disclosed herein can be used to determine the vehicle damage real-time, for example, when one of the two (or more) vehicles in question is not in motion. The methods can be adapted for use in moving vehicles as well, through filtering of baseline vehicle sensor noise. Some methods can include a blockchain process to communicate the damage with relevant parties. Communication with an insurance company of either the damaged vehicle or the damage-causing vehicle for the process of insurance claims can be automated as well.

Example use cases can be implemented in non-connected vehicles as well as connected vehicles. The systems and methods herein contemplate instant reporting for small damages like scratches or dents instant insurance claim creation, as well as identification of the vehicle that caused the damage. The systems and methods herein can be used to identify nearby service centers for repairs, as well as communication with law-enforcement to deliver relevant information which can be useful to identify targets like stolen vehicles.

Illustrative Embodiments

Turning now to the drawings, FIG. 1 depicts an illustrative architecture 100 in which techniques and structures of the present disclosure may be implemented. The architecture 100 can comprise a first vehicle 102, a second vehicle 104, an individual 106, a service provider 108, and a network 110. In general, the objects identified in the architecture can be configured to use the network 110 for communication. The network 110 may include any one or a combination of multiple different types of networks, such as cable networks, the Internet, wireless networks, and other private and/or public networks. In some instances, the network 110 may include cellular, Wi-Fi, or Wi-Fi direct. For example, the first vehicle 102 can include a communications module 103 used to transmit and receive data over the network 110 to other entities such as the service provider 108.

The first vehicle 102 can be configured to detect, classify, and report damage events. Alternatively, the first vehicle 102 can be configured to collect sensor data and relay the same to the service provider 108. The service provider 108 can classify and report damage events. The first vehicle 102 can comprise one or more sensors 112A-112N, one or more cameras 114A-114N, and a controller 116. In general, the one or more sensors 112A-112N can comprise any combination of audio sensors or motion sensors. These one or more sensors 112A-112N could include any mechanism capable of detecting sound, vibration, acceleration, and so forth. For example, the one or more sensors 112A-112N could include a microphone, an accelerometer, and a gyroscope—just to name a few.

The one or more cameras 114A-114N can include a first camera 114A associated with a right-side of the first vehicle 102, and a second camera 114B associated with a rear of the first vehicle 102, such as a backup camera. The first vehicle 102 can include other cameras than those described above, but these specific cameras have been described for the non-limiting purposes of describing some aspects of the present disclosure. Some cameras may be fixed in their position allowing these cameras to obtain images in a fixed field of view. Other cameras of the first vehicle 102 could be configured to pan, tilt, or otherwise move. In the above example, the first camera 114A may be a fixed position camera, while the second camera 114B can pan and/or tilt. In general, the cameras can be controlled using the controller 116, as will be discussed in greater detail herein.

The controller 116 can comprise a processor 118 and memory 120. The memory 120 stores instructions that are executed by the processor 118 to perform aspects of sensor signal collection, damage event detection, as well as other features described herein. When referring to operations executed by the controller 116 it will be understood that this includes the execution of instructions by the processor 118.

Broadly, the controller 116 can be configured to communicatively couple with the one or more sensors 112A-112N when the first vehicle 102 is in a monitoring mode. The monitoring mode can be implemented on an ad hoc basis, or when the first vehicle 102 is in a stationary position such as when the first vehicle 102 is parked in a parking lot or stationary at a light. Again, these are merely examples of situations where the controller 116 can monitor the one or more sensors 112A-112N for signals. In other configurations, the controller 116 obtains sensor signals from the one or more sensors 112A-112N continuously (e.g., a continuous vehicle sensor signal).

The sensor signals received by the controller 116 can be processed to determine when a damage event has occurred. Prior to processing signals received from the one or more sensors 112A-112N, the controller 116 can be configured to apply a baseline vehicle noise level. The baseline vehicle noise level can be determined from empirical information obtained from a vehicle manufacturer. Alternatively, the controller 116 can determine baseline vehicle noise level from continuous sensor signal input received from the baseline vehicle noise level. FIG. 2 illustrates an example accelerometer signal graph 200 that is indicative of continuous vibration of the first vehicle 102. This continuous vibration identified in the accelerometer output 202 could occur due to vehicle movement, vehicle engine operation, or other motion inducing events relative to the first vehicle 102. As illustrated in FIG. 3, a damage event can be detected when a deviation 300 in accelerometer signal strength is detected relative to the baseline vehicle noise level (e.g., accelerometer output 302). The deviation 300 may be related to a scratch caused by vehicle contact by another vehicle or from a bicycle, as an example. Methods for determining both damage type and/or damage intensity/severity are disclosed in greater detail infra.

FIG. 4 is another example accelerometer graph 400 includes a baseline output 402 with a deviation area 404, which may be caused by a damage event such as a scratch. In FIG. 5, another example accelerometer graph 500 includes a baseline output 502 with a deviation area 504, which may be caused by a damage event such as a dent. For example, a door of the second vehicle 104 may impact a door of the first vehicle 102. Collectively and individually, FIGS. 2-5 provide visualizations of various conditions and corresponding sensor data.

Referring back to FIG. 1, the controller 116 can implement logic such as machine learning to determine any baseline vehicle noise level, as well as damage event detection and classification. The controller 116 can train a machine learning model 117 such as Long Short-Term Memory (LSTM) or Gated Recurrent Units (GRU). In general, the machine learning models disclosed herein can be trained on, and process, inputs from multiple sensors like accelerometers, gyroscopes, sounds or vibrations, all of which may be evaluated to classify/identify the type of damage and its intensity.

Using supervised learning, samples of sensors signals from various conditions (e.g., scratch, dent, impact, crash, etc.) can be determined and divided into separate classes, referred to as damage types or classes. While LSTM/GRU methods have been described, the present disclosure is not so limited and other suitable training and detection machine learning algorithms can be used. Once a machine learning model is trained, the continuous signal output response from the one or more sensors 112A-112N can be directed to the trained model which, can be used to classify the damage into different categories/types. In some instances, more than one machine learning model can be used. Thus, one or more classifier models can be utilized such as a damage type classifier and a damage severity classifier.

Once a determination of damage classification is complete, the controller 116 can apply one or more damage severity models to determine a magnitude or intensity of a damage event. In one example, the severity of damage could be determined by measuring the duration and magnitude of a deviation in sensor output. Referring back to FIG. 3, a magnitude of a damage event, such as a scratch, could be indicated by a magnitude (e.g., height) of the deviation 300.

Once damage has been identified, and in some use cases classified in terms of type and/or severity, the controller 116 can be configured to determine a location on the first vehicle 102 where the damage occurred. For example, the damage could occur on a surface of the vehicle, such as a door, a quarter panel, a window, or other similar vehicle structures. In an example use case, a door of the second vehicle 104 impacts the right side of the first vehicle 102, such as a door and causes a dent type of damage. The controller 116 identifies a location on the first vehicle 102, such as the door. The controller 116 can then classify the damage in terms of type and/or severity. The location of the damage could be determined generally as occurring on a specific side, front, or back of the vehicle. More specific damage location determination could occur when sensors positioned at various locations on the vehicle are used in combination. A type of signal triangulation process could be used to identify a more specific location of the damage on the vehicle.

Figure 6A:
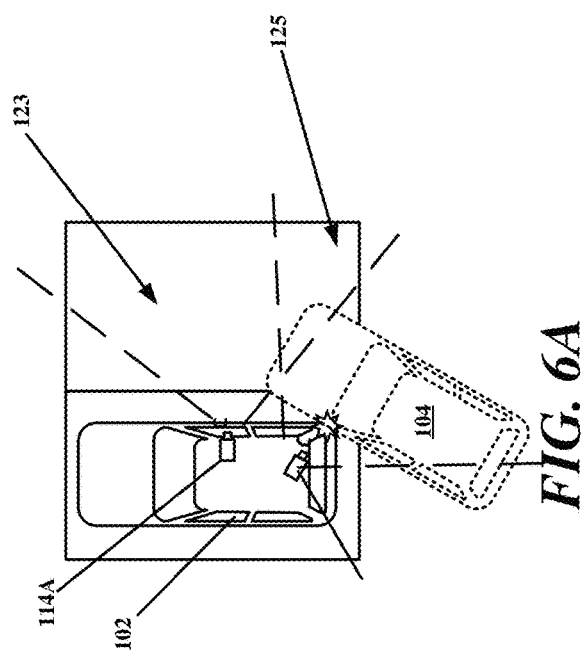
FIGS. 6A and 6B collectively depict a damage event data collection process using cameras of a vehicle.

Once a general or specific location of the damage is known, the controller 116 can activate the first camera 114A, which corresponds to the side on which damage has occurred. As illustrated in FIG. 6A (referencing the schematic controller aspects of FIG. 1), the controller 116 can activate a camera on a side of the first vehicle corresponding with, or adjacent to, the location on the first vehicle where damage has occurred.

The first camera 114A has a field of view 123 and camera images can be obtained of the second vehicle 104. The images may include vehicle identifying information such as make, model, style, vehicle type, or other information. In this example, only a small portion of the second vehicle 104 is present in the field of view 123. Thus, the controller 116 can continue to obtain images of the second vehicle 104 using another camera with a second field of view 125.

Figure 6B:
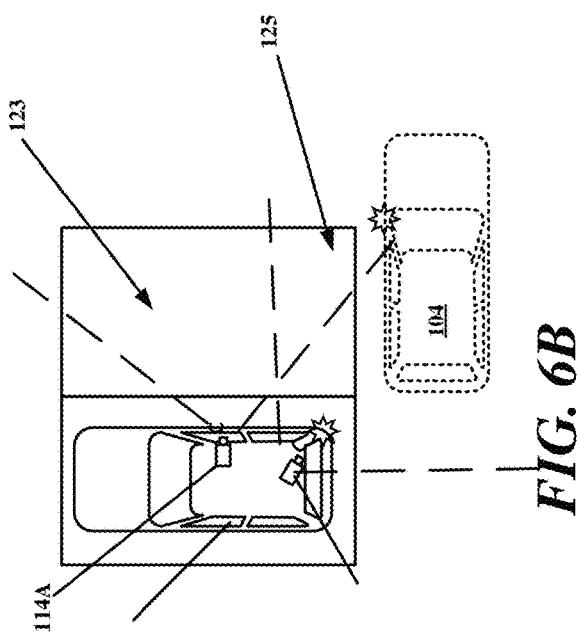

As illustrated in FIG. 6B, the controller 116 can activate additional cameras, such as the second camera 114B, which can capture additional images of the second vehicle 104. For example, the second camera 114B may capture images of the rear part of the second vehicle 104, which may include capturing identifying information such as a license plate number or vehicle make. Thus, the second vehicle 104 can be tracked initially by the first camera 114A and then by the second camera 114B. The controller 116 can cause the second camera 114B to pan or tilt to record the second vehicle 104 as it moves away from the first vehicle 102.

As camera images are obtained, the controller 116 can process the images to determine identifying information in the images. For example, the controller 116 can identify a vehicle make or model from indicia present on the vehicle. The controller 116 could identify other information, such as the owner of the vehicle. For example, if the vehicle is a rental unit, the controller 116 can identify a name of the rental company on a sticker or other indicia present on the vehicle.

Other identifying information could include a license plate number, bumper stickers, or other visually distinctive information. Identifying information in the images can be found using pattern-recognition artificial intelligence, as an example. In some instances, the identifying information can include a corresponding damage area identified on the second vehicle 104. For example, a damaged area 121 is identified on the second vehicle 104 from camera images.

The camera images can be forwarded to a mobile device 122 of a user, such as the owner of the vehicle. Identifying information can be used as the basis for determining a receiving party 124 for the images. For example, when the identifying information includes a license plate or a vehicle owner, the identifying information can be used to route the camera images and other information to the receiving party 124 such as an insurance carrier, police, or emergency response service. In some instances, the mobile device 122 is registered with the vehicle.

In another example use case, the controller 116 could determine that a damage event, such as a key scratch has been detected. The first camera 114A can be activated to obtain images. The images can be processed to identify an individual 106 holding a key 115 that may have been used to create the key scratch damage. In some instances, the key held by the individual 106 may be considered to be identifying information because the controller 116 identified the damage type as a key scratch. The images of the individual can be evaluated to determine other identifying information such as facial recognition or identification clothing or indicia.

In addition to relaying camera images, the controller 116 can be configured to complete an insurance claim template. For example, when a damage event occurs, the controller 116 can assemble a claim form that can include identifying information for the first vehicle 102 as well as the object that caused the damage event, such as the second vehicle 104 (could include any other object such as an individual, a bicycle, or the like). Location information, as well as day and time, can be gathered. This information can be transmitted to the receiving party 124, such as an insurance carrier, along with the camera images, as well as any identifying information found in the camera images. Some identifying information can be extracted from the images and inserted into the insurance form. For example, a license plate number could be added to a field of the insurance form. Other related insurance claims processing functions can be facilitated using the collected information such as damage estimation and confirmation of damage and estimate with the owner of the damaged vehicle.

In one use case, a method could include receiving an indication that the damage has been classified as claimable damage (e.g., above a specific intensity level or severity). The method may include generating an insurance claim with the camera images, as well as transmitting the insurance claim with the camera images to an insurance carrier.

In the examples described above, the data collected during monitoring, processing, and/or reporting can be stored in a blockchain ledger. Blockchain can be used to capture evidence such as images/video clips, license plates, location, type of vehicle, type of damage, the intensity of damage, approximate costs and sent to the insurance holder. Some of the in-vehicle parameters such as speed, vehicle alerts can also be vital to understand the initiator of the damage, which can also be captured as well.

As noted above, while the features described above have been disclosed as occurring at the vehicle level, the service provider 108 can be similarly configured to receive, process, and report vehicle damage. The service provider 108 can receive sensor data from the vehicle and process the sensor data. The service provider 108 can store and execute the machine learning models described above to classify damage based on type and severity. The service provider 108 can also provide the reporting functionalities as well, providing the mobile device 122 or receiving party 124 with any of the damage event information mentioned above, which can include contextual vehicle information such as location, direction, speed, and the like, along with information regarding the object that caused the damage.

In one use case, damage occurring to a vehicle in a parking lot is a common scenario. Identifying the reason for the damage may rely on information obtained from security cameras. Methods disclosed herein can uniquely identify the type of damage, its intensity with the use of basic vehicle sensors. The cameras of the vehicle can be used to generate and corroborate extra evidence of the damage. This reduces the effort taken in creating reports as well as serves as a mechanism to notify third parties such as insurance companies. These solutions are applicable even for smaller damage events which may go unnoticed. Multiple smaller reports can be generated so when the vehicle is in service, all the necessary reports can be claimed.

Figures 7, 8:
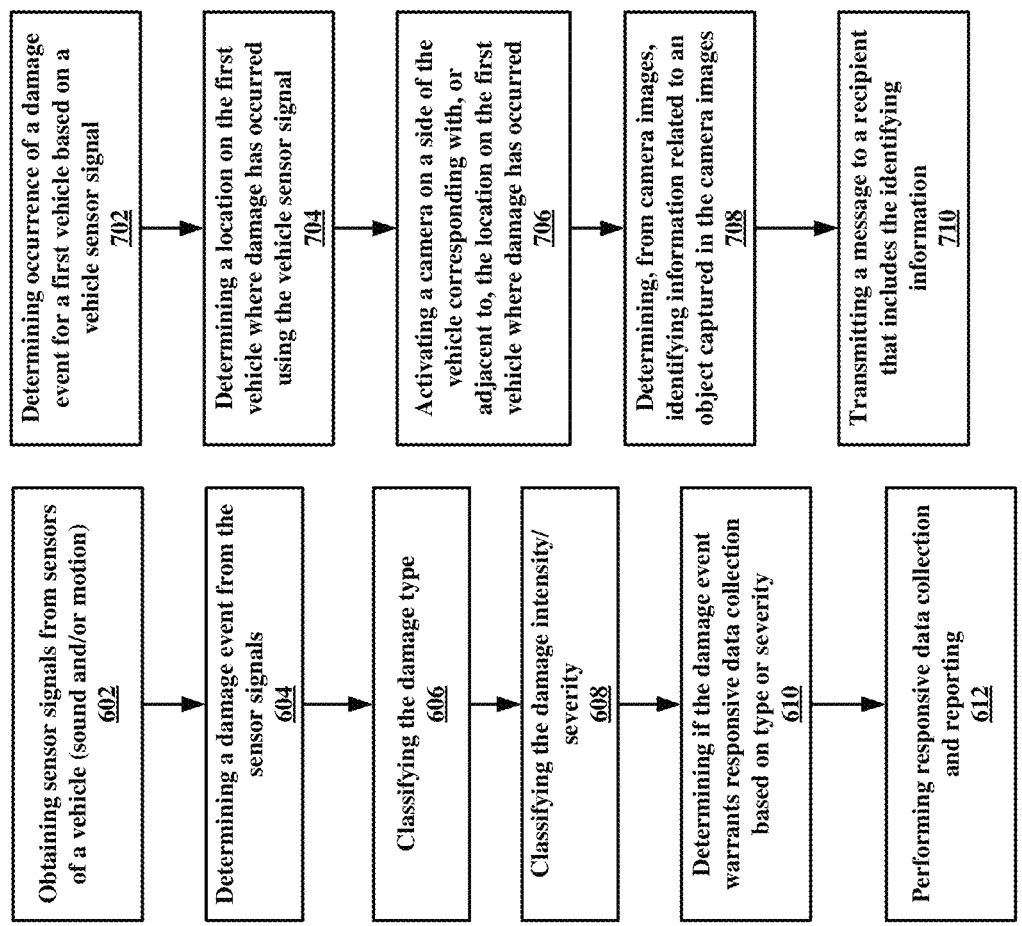
FIG. 7 is a flowchart of an example method of the present disclosure.
FIG. 8 is a flowchart of another example method of the present disclosure.

FIG. 7 is a flowchart of an example method of the present disclosure. The method includes a step 602 of obtaining sensor signals from sensors of a vehicle. The method can include a step 604 of determining a damage event from the sensor signals. In some instances, the method can include a step 606 of classifying the damage type and a step 608 of classifying the damage intensity/severity. If damage has not been detected, the processed sensor signals information can be used to train the machine learning related to general damage event detection in step 604. For example, sensor signal information not associated with damage may be used to update baseline sensor output that can be used to remove baseline sensor noise caused, for example, by engine vibration, climate system activity, and the like.

In some instances, the method can include a step 610 of determining if the damage event warrants responsive data collection. For example, responsive data collection such as camera activation may not occur unless damage is determined to be of a specific type or intensity. In one example, responsive data collection may not occur until accelerometer signals exceed an acceleration threshold. Step 610 is optional in some configurations of the method.

The method can include a step 612 performing responsive data collection and reporting. Responsive data collection can include activating vehicle cameras to obtain images. As noted above, this can include activating cameras on a side of the vehicle where the damage was detected (or even cameras adjacent thereto). The images are then processed to identify information related to the object that caused the damage (or may have caused the damage). Camera images/video and/or identifying information can be transmitted to a mobile device of the owner of the damaged vehicle, as well as to any identified third parties such as insurance carriers, emergency services, and the like. Data collected during this period can be stored in a blockchain and a report can be generated and transmitted to a third party as desired. As noted above, in-vehicle parameters of the damaged vehicle can be collected such as speed, vehicle alerts, tire pressure, vehicle location, and so forth.

FIG. 8 is a flowchart of an example method of the present disclosure. The method can include a step 702 of determining occurrence of a damage event for a first vehicle based on a vehicle sensor signal. To be sure, the vehicle sensor signal could include sensor signals from many different types of sensors that broadly include sounds and motion sensors. The method includes a step 704 of determining a location on the first vehicle where damage has occurred using the vehicle sensor signal. For example, damage may occur to a rear bumper of a vehicle. Next, the method can include a step 706 of activating a camera on a side of the vehicle corresponding with, or adjacent to, the location on the first vehicle where damage has occurred. The method can include a step 708 of determining, from camera images, identifying information related to an object captured in the camera images, as well as a step 710 of transmitting a message to a recipient that includes the identifying information.

Advantageously, aspects of the present disclosure can be used in non-connected vehicles as well as connected vehicles. The methods and systems disclosed herein can be configured to provide instant (e.g., real-time) reporting for small damage like scratches or dents, as well as facilitation of instant insurance claims and identification of the vehicle that caused the damage. The systems and methods can be used to identify nearby service centers for repairs, and/or inform law-enforcement to send the relevant information which can be useful to identify targets like a stolen vehicle. Location-based features may rely on location information obtained from a connected vehicle. Nearby services can be located using a current location of the damaged vehicle through, for example, a mapping or navigation service available to the vehicle or the service provider.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   training and applying a noise model to identify a baseline vehicle noise or vibration level in a first vehicle based on a first signal from a vehicle sensor of the first vehicle;
   receive a second signal from the vehicle sensor, the second signal associated with a second vehicle noise or vibration level;
   determining an occurrence of a damage event for the first vehicle based on a comparison between the baseline vehicle noise or vibration level and the second vehicle noise or vibration level;
   classifying a type of damage associated with the damage event as a first type of damage using one or more classifier damage type models by comparing the second signal to a sample signal indicative of the first type of damage;
   determining a damage severity of the damage using one or more classifier damage severity models by determining a magnitude of a difference between the baseline vehicle noise or vibration level and the second signal;
   determining a location on the first vehicle where damage has occurred using the second signal;
   activating a camera on a side of the first vehicle corresponding with, or adjacent to, the location on the first vehicle where damage has occurred;
   determining, from one or more camera images, identifying information related to an object captured in the camera images, wherein the object is associated with a cause of the occurrence of the damage event; and
   transmitting a message to a recipient that includes the identifying information, the type of damage, and the damage severity.

2. The method according to claim 1, wherein when the object is a second vehicle, the identifying information comprises a vehicle make, a vehicle type, a vehicle model, a license plate, a vehicle location, and any unique design on the second vehicle.

3. The method according to claim 1, further comprising transmitting the camera images to a mobile device in real-time over a network.

4. The method according to claim 1, further comprising tracking the object associated with the cause of the occurrence of the damage event after the damage event occurs using the camera.

5. The method according to claim 1, wherein the damage event is determined based on signals received from any of a motion sensor, an audio sensor, or combinations thereof.

6. The method according to claim 1, further comprising:
   receiving an indication that the damage has been classified as claimable damage;
   generating an insurance claim with the camera images and an insurance claim template; and
   transmitting the insurance claim with the camera images to an insurance carrier.

7. A device, comprising:
a processor; and
a memory for storing instructions, the processor executing the instructions to:
- train and applying a noise model to identify a baseline vehicle noise or vibration level in a first vehicle based on a first signal from a vehicle sensor of the first vehicle;
- receive a second signal from the vehicle sensor, the second signal associated with a second vehicle noise or vibration level;
- determine an occurrence of a damage event for the first vehicle based on a comparison between the baseline vehicle noise or vibration level and the second vehicle noise or vibration level;
- classify a type of damage associated with the damage event as a first type of damage using one or more classifier damage type models by comparing the second signal to a sample signal indicative of the first type of damage;
- determine a damage severity of the damage using one or more classifier damage severity models by determining a magnitude of a difference between the baseline vehicle noise or vibration level and the second signal;
determine a location on the first vehicle where damage has occurred using the second signal;
- activate a first camera on a side of the first vehicle corresponding to the location on the first vehicle where damage has occurred;
- determine, from one or more camera images, identifying information related to an object captured in the camera images, wherein the object is associated with a cause of the occurrence of the damage event; and
- transmit a message to a recipient that includes the identifying information, the type of damage, and the damage severity.

8. The device according to claim 7, wherein the processor is configured to activate a second camera adjacent to the first camera to capture additional camera images.

9. The device according to claim 8, wherein the processor is configured to track the object with the first camera or the second camera as the object associated with the cause of the occurrence of the damage event moves relative to the first vehicle.

10. The device according to claim 8, wherein the processor is configured to transmit the camera images to a service provider, wherein the service provider transmits the camera images to a mobile device registered to the first vehicle.

11. A device, comprising:
a processor; and
a memory for storing instructions, the processor executing the instructions to:
- obtain a vehicle sensor signal from a vehicle sensor of a vehicle;
- transmit a continuous vehicle sensor signal to a service provider the service provider being configured to:
- train and applying a noise model to identify a baseline vehicle noise or vibration level in a first vehicle based on a first signal from a vehicle sensor of the first vehicle;
- receive a second signal from the vehicle sensor, the second signal associated with a second vehicle noise or vibration level;
- determine occurrence of a damage event for the vehicle based on a comparison between the baseline vehicle noise or vibration level and the second vehicle noise or vibration level;
- classify a type of damage associated with the damage event as a first type of damage using one or more classifier damage type models by comparing the second signal to a sample signal indicative of the first type of damage;
- determine a damage severity of the damage using one or more classifier damage severity models by determining a magnitude of a difference between the baseline vehicle noise or vibration level and the second signal;
- determine a location on the vehicle where damage has occurred using the second signal;
- activate a first camera on a side of the vehicle corresponding to the location based on an indication received from the service provider that damage event has occurred, so as to obtain camera images;
- determine, from the camera images, identifying information related to an object captured in the camera images, wherein the object is associated with a cause of the occurrence of the damage event; and
- transmit the camera images to the service provider, the type of damage, and the damage severity.

12. The device according to claim 11, wherein the service provider is configured to transmit a message to a recipient that includes the identifying information for the object found in the camera images.

13. The device according to claim 12, wherein the service provider transmits the camera images to a mobile device registered to the vehicle.

14. The device according to claim 12, wherein the continuous vehicle sensor signal is obtained from a plurality of sensors that comprise an accelerometer, a gyroscope, an audio sensor, and combinations thereof.

* * * * *